Sept. 20, 1971  R. G. GRIGORIAN  3,605,305
MANNEQUIN DISPLAY ARRANGEMENT
Filed Nov. 29, 1968  5 Sheets-Sheet 1

INVENTOR
RAPHAEL G. GRIGORIAN
BY
SPARROW AND SPARROW
ATTORNEYS

Sept. 20, 1971 R. G. GRIGORIAN 3,605,305
MANNEQUIN DISPLAY ARRANGEMENT
Filed Nov. 29, 1968 5 Sheets-Sheet 2

INVENTOR
RAPHAEL G. GRIGORIAN
BY
SPARROW AND SPARROW
ATTORNEYS

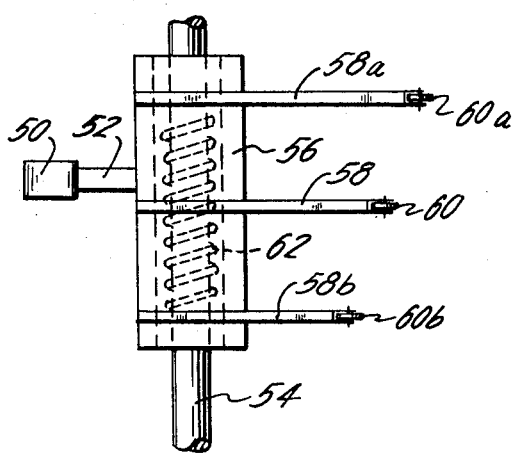
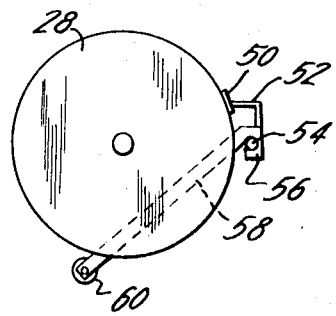
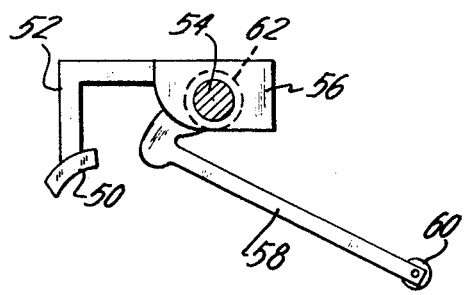
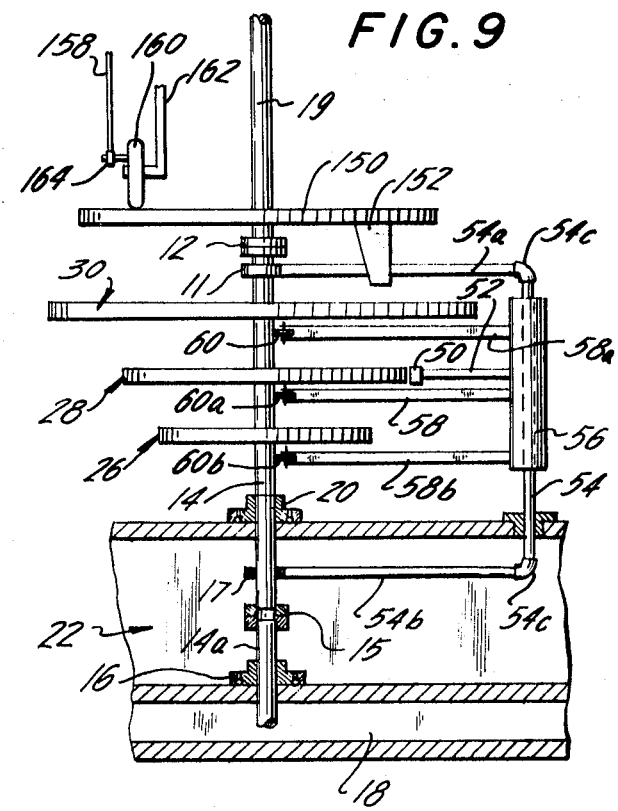
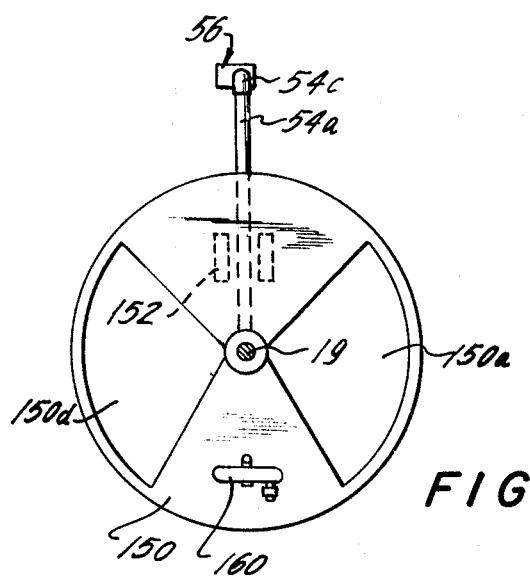

Sept. 20, 1971    R. G. GRIGORIAN    3,605,305
MANNEQUIN DISPLAY ARRANGEMENT
Filed Nov. 29, 1968    5 Sheets-Sheet 4
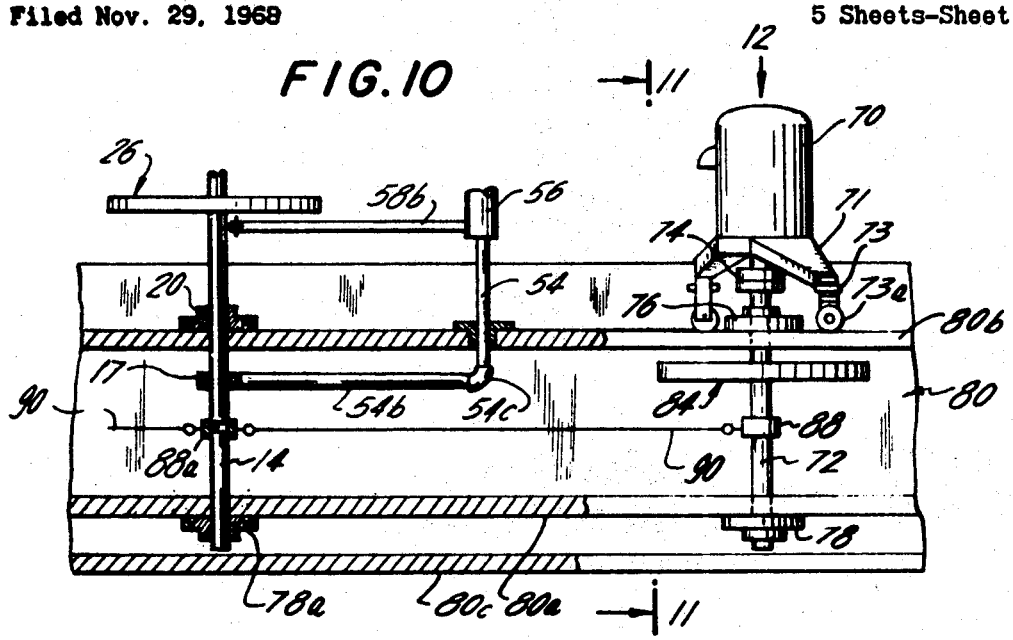
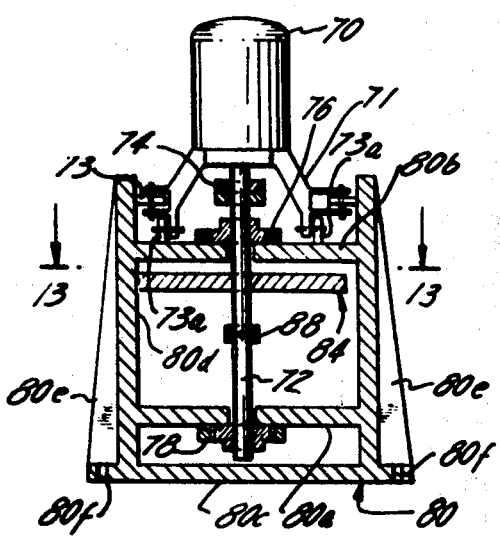
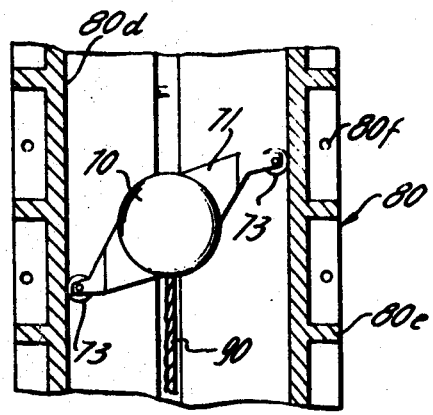
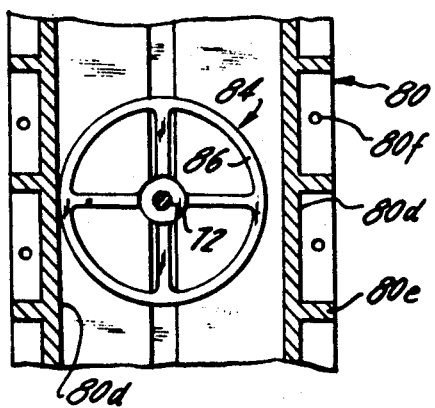
INVENTOR
RAPHAEL G. GRIGORIAN
BY
SPARROW AND SPARROW
ATTORNEYS

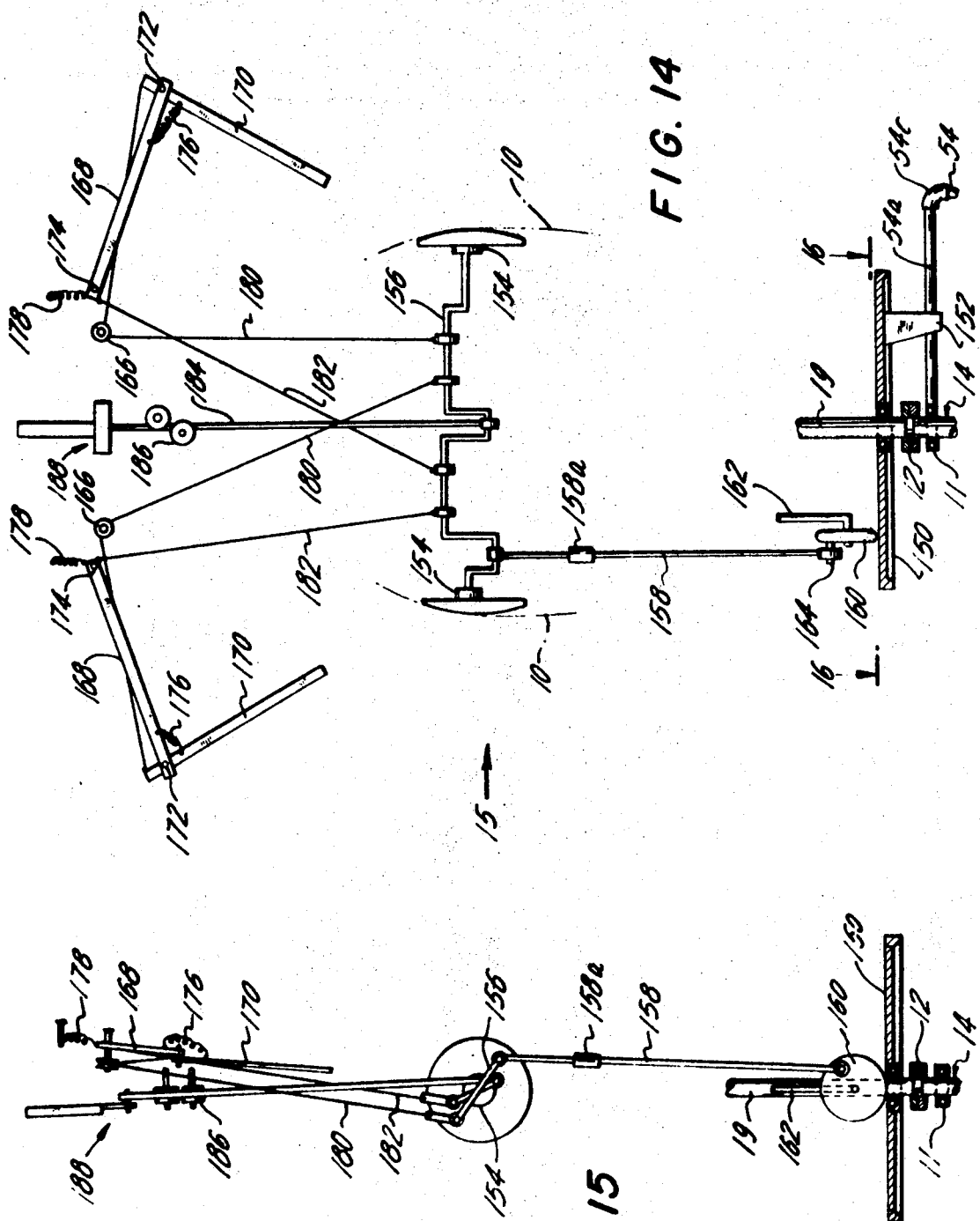

United States Patent Office 3,605,305
Patented Sept. 20, 1971

3,605,305
MANNEQUIN DISPLAY ARRANGEMENT
Raphael G. Grigorian, 90—60 53rd Ave.,
Elmhurst, N.Y. 11373
Filed Nov. 29, 1968, Ser. No. 779,788
Int. Cl. G09f 19/08
U.S. Cl. 40—106.31
13 Claims

ABSTRACT OF THE DISCLOSURE

A mannequin display arrangement in which a number of mannequins are conveyed along a predetermined path. Each mannequin is mounted upon the conveyor through an individual rotational drive which rotates the mannequin in desired directions and at predetermined intervals along the path. The rotational movement of the mannequin, as well as its limbs with respect to the conveyor system which moves the mannequin along the path, is independent of the motion of the conveyor. A brake system holds the mannequin stationary with respect to the conveyor, when not being rotated through its individual rotational drive.

BACKGROUND OF THE INVENTION

In arranging mannequins for the display of wearing apparel, for example, it is desirable to move a number of such mannequins wearing different clothes, past the viewer. At the same time, it is desirable to rotate the mannequin while it moves along the path in front of the viewer so that the latter may observe the appearance of the clothes from all sides. With the display of clothes, in this manner, in which the viewer is permitted to see different styles, and each style is viewed from all sides, the viewer can readily arrive at a decision for the selection of clothes.

While mannequins have been, heretofore, conveyed along a path in department store windows, for example, such mannequins were not rotated, at will, at specific intervals so that viewers could see all aspects or sides of the clothes being displayed or modeled. The mannequin limbs were also not moved during rotation of the mannequin. At the same time, the mannequin display systems have been, in the past, complex in design, and difficult to assemble readily for display purposes. Furthermore, the conventional mannequin displays have been uneconomical to construct and maintain in operation. It is a desideratum of the present invention to overcome the foregoing disadvantages and inconveniences.

SUMMARY OF THE INVENTION

An arrangement for the display of mannequins by which they are conveyed along a display path and simultaneously rotated and moved in selected directions and predetermined intervals. The mannequin is movably mounted on a conveyor which imparts translational motion to the mannequin. The mannequin mounting is such that rotational motion may be imparted to the mannequin independent of the translational motion of the conveyor. The limbs of the mannequin may also be moved as a result of the mannequin rotation. Each mannequin mount is equipped with frictional wheels which cause the mannequin to rotate when in contact with frictional surfaces mounted along the display path. A brake system operating in conjunction with the frictional wheels assures that the mannequin is prevented from rotation, when the wheels are not positively driven through frictional segments along the display path.

It is an object of the present invention to provide a mannequin display arrangement in which both translational and rotational motion is imparted to the mannequin including its limbs along a predetermined path.

It is a further object of the present invention to provide a display arrangement composed of structural sections which may be assembled to conform to any desired path configuration.

It is moreover an object of the present invention to provide a display arrangement which is simple in design, may be readily installed and assembled, and requires little maintenance.

Various further and more specific purposes, features and advantages will clearly appear from the detailed description given below taken in connection with the accompanying drawing which forms part of this specification and illustrates merely by way of examples embodiments of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings, in which

FIG. 6 is an elevational view of the brake system for inhibiting rotation of the mannequin;

FIG. 7 is a plan view of the brake system of FIG. 6;

FIG. 8 is a plan view of the brake system of FIG. 7 when operating in conjunction with the mannequin rotational driving wheels;

FIG. 9 is a side elevational view of the device shown in FIG. 1;

FIG. 10 is an elevational view of a conveyor unit for moving the mannequins translationally along a desired display path;

FIG. 11 is an end view taken along line 11—11 in FIG. 10;

FIG. 12 is a top view taken along line 12—12 in FIG. 10;

FIG. 13 is a plan view taken along line 13—13 in FIG. 11;

FIG. 14 is a side view taken along line 14—14 in FIG. 1, and shows the mechanism for moving the limbs and head of the mannequin;

FIG. 15 is an end view taken along line 15—15 in FIG. 14; and

FIG. 16 is a top view taken along line 16—16 in FIG. 14.

DESCRIPTION OF THE PREFERRED EMBODIMENTS

Figure 3:
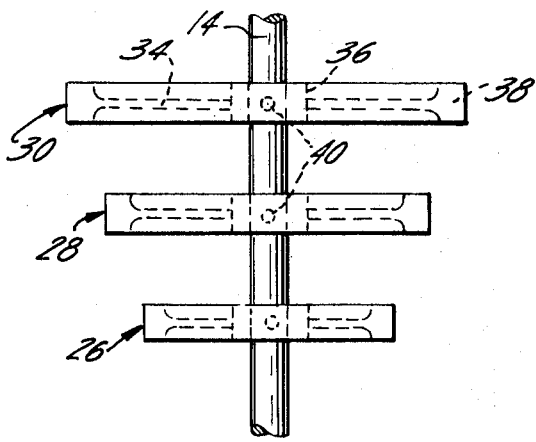
FIG. 3 is an end view of the driving wheels in FIG. 1.

Referring to the drawings a mannequin 10 is secured to a mounting post 19. The latter is fixed through coupling 12, to a rotational shaft 14 which is held in an end-bearing 16. The end-bearing 16 is secured to a conveyor 18 which moves the shaft 14a, which is connected to shaft 14 by coupling 15, and hence the mannequin 10 along a desired display path. The shaft 14 is further supported by the bearing 20 in contact with a frame 22. This frame is designed in the form of two L sections secured to the floor by flanges 22a at the base. The two L sections of the frame 22 provide for a free space 46, when assembled in place, so as to permit the shaft 14 to freely move along within the space or slot between the feet of the L sections. The bearings 16 and 20 may be in the form of ball or roller bearings by which the frictional resistance forces are maintained at a minimum. The flanges 22a contain openings 22b for securing to the floor with suitable bolts. Ribs 22c are spaced at regular intervals along the L sections for reinforcement purposes.

Figure 2:
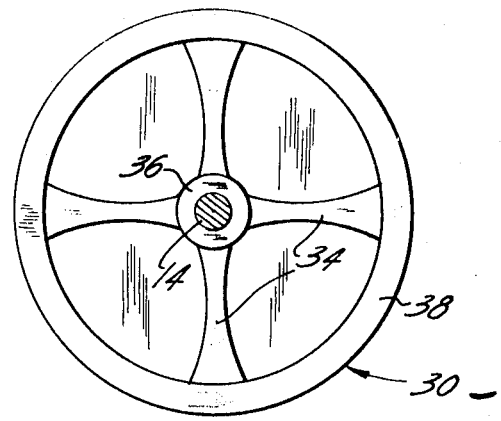
FIG. 2 is a top view of a driving wheel in FIG. 1.

For the purpose of rotating the shaft 14 with respect to the conveyor 18, and thereby rotate the mannequin 10, rotational driving wheels 26, 28 and 30 are provided. These rotational driving wheels are secured to the shaft 14 by means of keys 32, for example, and have a frictional surface at their outer rim. This frictional surface may be generated through knurling of the rim surfaces, or applying a rubberized layer to the rims of the wheels, for example. For economical construction of the wheels these may be designed with spokes 34 connecting the rim 38 of the wheel to the hub 36, as shown in FIG. 2. When designed in this form, set screws 40 may be used to fasten the wheels to the shaft 14 in place of the keys 32.

The wheels 26, 28 and 30 are of different diameters so as to result in the rotation of the shaft 14, and hence the mannequin 10, at different angular speeds. Whereas only three such different wheels are shown in the disclosed embodiment, any number of such different wheels may be mounted upon the shaft 14 for the purpose of imparting varying rotational speeds to the mannequin as it is translated along the desired display path by the conveyor 18.

Figure 4:
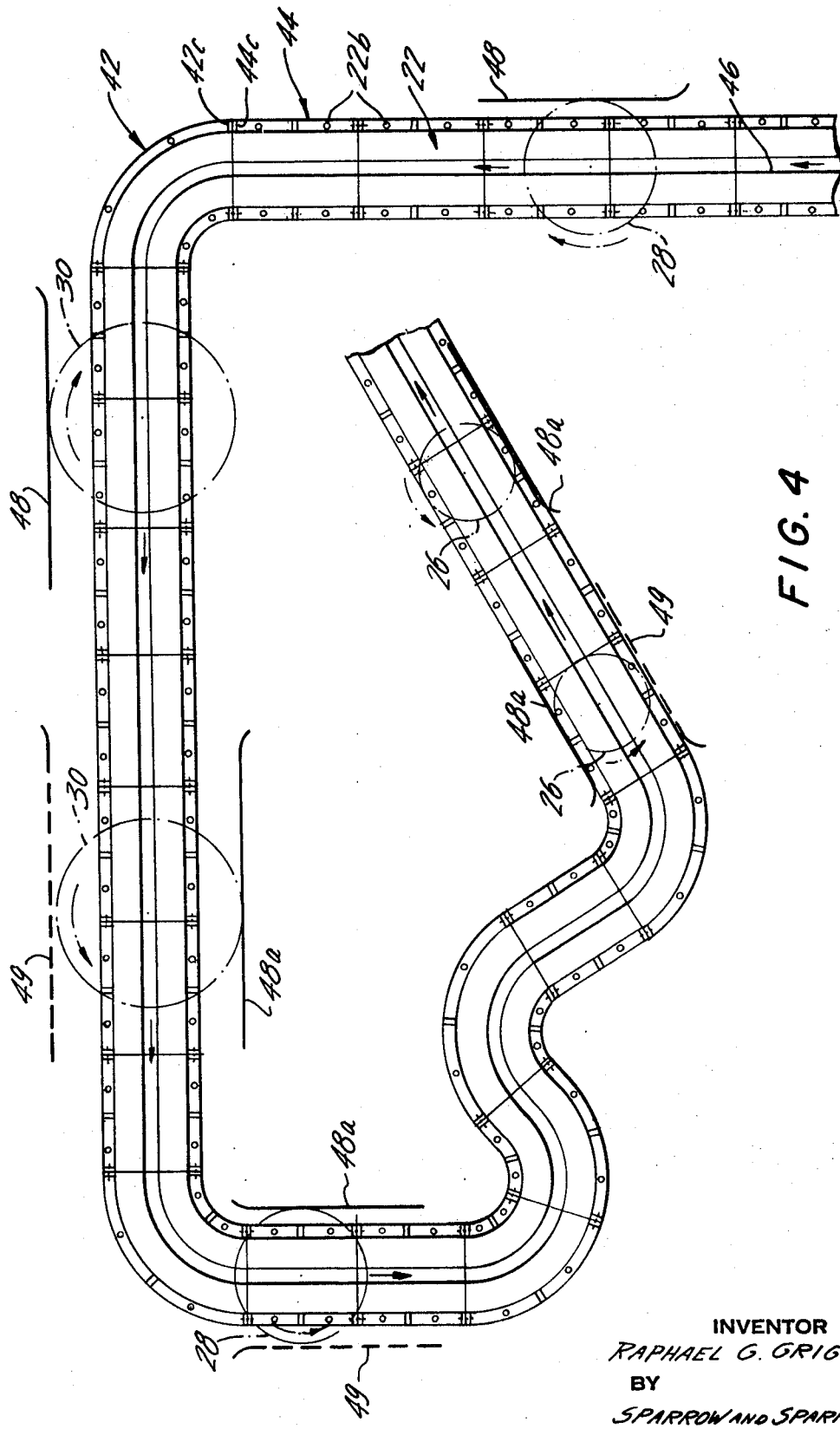
FIG. 4 is a top plan view of the mannequin display path and the guiding frame installed along the path.

The construction of the display path is shown in FIG. 4. The desired display path is formed by assembling standard track sections 42 and 44 so as to result in the desired path configuration. The space 46 left between the two L sections of the frame 22, permits free passage of the shaft 14 as it is conveyed along the path. Thus, the shaft 14 is equal in diameter to the width of the slot or space 46 between the feet of the two L sections of the frame 22. The track sections 42 and 44 are made of standard design so that any number of them may be combined to yield any desired path configuration. The standard track sections may be joined together by passing bolts through end ribs, 42c and 44c, for example provided at the ends of the sections.

Figure 5:
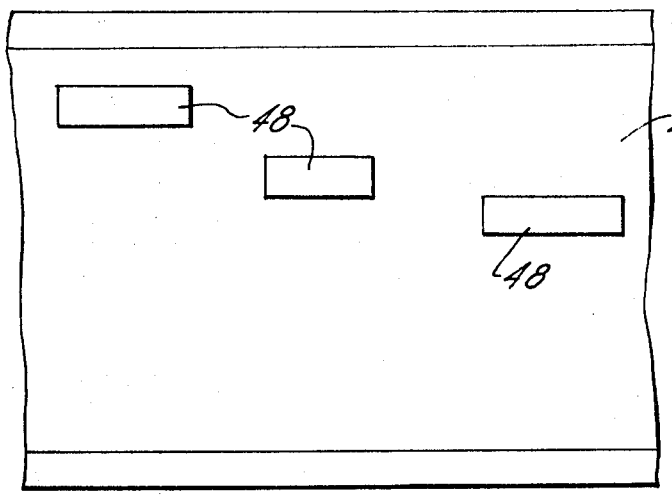
FIG. 5 is a partial elevational view along a typical section along the path of FIG. 4 and shows the arrangement of frictional segments which impart rotational motion to the mannequin when conveyed along the path.

Mounted along the display path, are rotation segments 48. These are linear segments with frictional surfaces which contact the respective wheels 26, 28 and 30, as the latter are moved past the segments 48. Thus, these rotation segments have a similar frictional surface as described in relation to the rims of the wheels 26, 28 and 30, and cause the latter to rotate when the wheels contact the segments. As a result of the rotation of the wheels, the mannequin is similarly rotated. By placing such rotation segments 48, 48a on both sides of the path, clockwise and counter clockwise rotation of the wheels, and hence of the mannequin, is realized as desired. For the purpose of rotating the shaft 14 at different speeds, the rotation segments are staggered in elevation along the desired path as shown in FIG. 5. Thus, by staggering these rotation segments 48, 48a in the vertical direction, in this manner, different wheels are contacted and driven as they move along the path, and hence different rotational speeds of the mannequin are realized. These rotation segments 48 may be mounted along the path by means of a mounting surface 23 which may be an extension of the frame 22.

When the wheels 26, 28 and 30 are not being positively driven by a rotation segment 48, or 48a in contact with the respective wheel, it is desired that the mannequin be held stationary with respect to the conveyor. A brake system is provided for this purpose, by which brake shoe 50 is maintained in contact with the wheels when they are not being acted upon by the rotation segments 48 or 48a. This brake shoe 50 is mounted upon an arm 52 rotatable about a shaft 54. The arm 52 extends from a central hub portion 56, mounted movably on the shaft 54. Arms 58 are also secured to the hub or block 56. Rollers 60 are provided at the ends of the arms 58. A torsional spring 62 is inserted over the shaft 54 and within the hub or block 56. One end of the spring is secured to the shaft 54, whereas the other end of the spring is secured to the block or hub 56 which is freely rotatable about the shaft 54.

The torsional spring 62 acts upon the hub or block 56 so as to rotate the latter in the direction by which the brake shoe 50 is maintained in contact with the wheel 28 under normal or usual operating conditions. The shaft 54 is now rotatable with respect to the conveyor and extends through the space 46 parallel to the shaft 14. The shaft 54 is held in bearings 11 and 17 through cross members 54a and 54b joined to the shaft by couplings 54c. Thus shaft 54 is fixed relative to shaft 14. An arm 58 is provided in association with each one of the wheels. When one of these wheels passes a rotation segment 48 or brake segment 49, the respective roller 60 bears simultaneously thereagainst and thereby rotates the block or hub 56, through the arm 58, so as to remove the brake shoe 50 from the wheel. The arrangement may be such that the roller 60 is acted upon the rotation segment 48 or brake segment 49 the same time as the wheel, or an instant beforehand. In this manner, the brake shoe becomes removed from the wheels when the latter are to be positively driven by the rotation segment. At all other times, the torsion spring 62 retains the brake shoe 50 in contact with wheel 28.

An alternate design for the conveyor system resides in ventional means, such as, a battery or line cord connected the embodiment of FIG. 10. A motor 70 (powered by conto a conventional electrical power source) is inverted and its shaft is coupled to a driving shaft 72, through means of the coupling 74. Upper and lower bearings 76 and 78, respectively, support the shaft 72 and hence the motor 70 upon a frame structure 80. This frame structure 80 has two vertical sides joined together by a base portion 80c. Arms 80a and 80b extend from the frame so as to leave a central slot for the passage of the shaft 72. The frame 80 is provided with reinforcing ribs 80e and mounting holes 80f similar to those described in relation to the frame 22.

A frictional driving wheel 84 is mounted upon the shaft 72 in a fixed manner. This frictional driving wheel 84 is in contact with a continuous frictional surface 80d along the conveying path. The end of the motor is provided with arms 71 terminating in rollers 73 mounted upon the arms. The rollers 73 are in contact with the inside walls of the frame 80.

Figure 1:
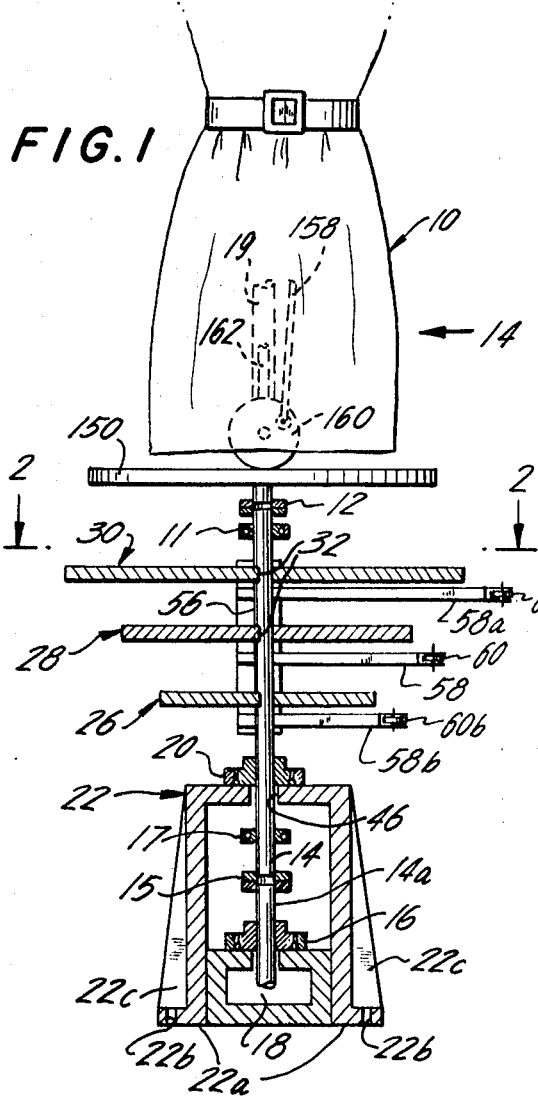
FIG. 1 is a sectional elevational view and shows the mannequin mounting and driving mechanisms.

In operation, the motor shaft turns and thereby rotates the driving wheel 84. As a result of the frictional contact between the wheel 84 and the surface 80d, the motor 70 is moved linearly along the conveying path as directed by the frame 80, since the body of the motor 70 is prevented from rotating as a result of the arms 71 which bear against the inside walls of the frame 80 through the rollers 73. Thus, the distance between the two rollers 73 is substantially greater than the dimensions between the inside wall, or width of the frame 80. A cord ring 88 is movably mounted upon the shaft 72 and is secured to a cord or cable 90. This cable 90, is, in turn, attached to the mannequin supporting and driving arrangement as shown in FIG. 1 and pulls the latter along the desired display path, Thus the arrangement of FIGS. 10 to 13 provides a simplified alternate design for imparting translational and conveying motion to the mannequins.

In a further embodiment of the display arrangement, a stationary plate member 150 is provided concentric with the shaft 19. The plate member 150 is mounted about the shaft 19 so that it may freely rotate relative to the shaft. A fork extension 152 of the plate 150 grips the stationary shaft 54a. To provide for a horizontal portion 54a joined to the vertical portion 54, a right angle coupling 54c may, for example, be applied. Since the portion 54a is directly connected to the stationary shaft 54, the projection fork 152 is effectively held stationary through the stationary vertical shaft 54.

The mannequin is secured to the mounting post or shaft 19 which is cnnected to shaft 14 by coupling 12 and rotates therewith. At the same time, the mannequin is free to rotate relative to the stationary plate member 150. Mounted within the mannequin are bearings 154 which hold a crank shaft 156. This crank shaft is driven by a connecting rod 158 pinned eccentrically to a wheel 160 having its rim surface in contact with the plate member 150. The center or axis of the wheel 160 is secured to the body of the manequin by means of the shaft 162. Thus, the shaft 162 is stationary with respect to the mannequin and permits the wheel 160 to rotate freely upon this shaft 162. The connecting rod 158 is pinned to the wheel 160 by means of the eccentrically located pin or crank pin 164.

As the mannequin is rotated with the shaft 14, the wheel 160, in contact with the plate member 150, also rotates. Through the rotation of the wheel 160, reciprocating motion is applied to the connecting rod 158, and this reciprocating motion drives the crank shaft 156 so that the latter rotates within the bearings 154. Pulleys 166 are mounted rotatably within the mannequin and spaced from the crank shaft 156.

Mechanical links 168 and 170 are inserted within upper arm portions and forearms, respectively, of the mannequin. The arrangement is such that when the link 170 rotates about the pivot 172, the forearms of the mannequin are rotated correspondingly. Similar motion of the upper arm portion results when the link 168 is rotated about the pivot 174 in the vicinity of the shoulder of the mannequin. Thus, the pivot 172 coincides with the elbow of the mannequin.

The links 168 and 170 are held in an initial or inoperative or normal position through the action of sprnigs 176 and 178. A cord 180 connects a portion of the crank shaft 156 to one end of the forearm link 170. As the crank shaft rotates, a force is applied to the cord 180, during a part of the crank shaft revolution, and this force rotates the link 170 against the action of the spring 176. During the remaining part of the crank shaft revolution, the tensile force applied to the cord 180 is released and as a result the link 170 is permitted to return to its initial position. The pulley 166 about which the cord 180 is wound, serves to change the direction of the cord so that the crank shaft may rotate the link 170 in the desired manner. To rotate the link 168 corresponding to the upper arm portion, a second cord 182 is provided. This cord also connects the crank shaft 156 to one end of the link 168. Similar to the motion described in relation to the link 170, the cord 182 causes rotation of the link 168 through a part of a crank shaft revolution. Rotation of the link 168 is produced through the tensile force applied to the cord 182, acting against the spring 178. During the remaining part of the crank shaft revolution, the tensile force in the cord 182 is released and the spring 178 acts to return the link 168 to its initial or normal position. This arrangement of moving the portions of the arms of the mannequin may be provided for both the left arm and the right arm as shown in the drawing.

A connecting link 184 also driven by the crank shaft 156 passes vertically through rollers 186. Attached to the connecting link 184, at its upper end, is a neck operating arrangement 188. This arrangement may have a spirally-cut shaft which, through reciprocating motion of the link 184, produces sidewise motion of the mannequin's neck. Accordingly, through rotation of the wheel 160 occurring with the rotation of the mannequin as previously described, the portions of the arms and the neck of the mannequin may be actuated and moved as desired. The bearing 158a on the connecting rod 158 is mounted within the mannequin and maintains the connecting rod in a substantially vertical position, while, at the same time, permitting reciprocating motion of this connecting rod. The plate member 150 may be shaped with cut-out portions 150a and 150b, for example, to impart specific or limited motion to the wheel 160, and thereby produce specifically controlled motion of the crank shaft 156. Such controlled motion imparted to the crank shaft results, in turn, in controlled motions of the limbs and head of the mannequin.

While the invention has been described and illustrated with respect to certain preferred examples, it will be understood by those skilled in the art after understanding the principle of the invention, that various changes and modifications may be made without departing from the spirit and scope of the invention.

What is claimed is:

1. A movable display arrangement comprising, in combination, conveying means movable along a predetermined path, display support means rotatably mounted on said conveying means and moving with said conveying means along said path, said display support means carrying the means to be displayed, and being rotatable with respect to said conveying means; rotational drive means on said display support means for rotating said support means when actuated; track means located along said path and in proximity of said conveying means; and actuating means on said track means and actuating said rotational drive means when said display support means is conveyed past said actuating means, whereby, said actuating means imparts rotation motion to said support means with respect to said conveying means, said rotational drive means comprising a plurality of wheels of different diameters secured to said support means and selectively rotated by said actuating means.

2. The movable display arrangement as defined in claim 1 wherein said display support means comprises supporting bearing means secured to said conveying means; rotatable shaft means freely rotatable in said supporting bearing means; and display mounting means on said shaft means for mounting the means to be displayed thereon.

3. The movable display arrangement as defined in claim 1 wherein said rotational drive means comprises at least one wheel secured to said support means and rotated by said actuating means through engagement with said actuating means at the rim of said wheel.

4. The movable display arrangement as defined in claim 1 wherein said actuating means comprises a contact segment in the path of said rotational drive means and contacting said drive means when the latter is conveyed past said segment of said conveying means.

5. The movable display arrangement as defined in claim 1 including braking means mounted on said conveying means for inhibiting rotational motion of said display support means when said rotational drive means is free from said actuating means.

6. The movable display arrangement as defined in claim 5 wherein said braking means comprises at least one brake shoe for inhibiting rotational motion of said drive means when contacting the same; brake releasing means on said track means for releasing said braking means; lever means supporting said brake shoe and contacting said brake releasing means for removal of said brake shoe from said drive means' lever support means secured to said conveying means and supporting said lever means; and spring means coupled to said lever means and said lever support means for maintaining said brake shoe in contact with said drive means when said lever means is free from said brake releasing means.

7. The movable display arrangement as defined in claim 1 wherein each of said wheels comprises a rim portion; a central hub portion; and a plurality of spokes connecting said rim portion to said hub portion.

8. The movable display arrangement as defined in claim 1 wherein said conveying means includes motor means;

motor support means on said track means; a rotatable member of circular cross-section and secured to the shaft of said motor means; driving strip means on said track means and in contact with the rim surface of said rotatable member; and means mounted on said motor means and contacting said track means whereby rotation of the frame of said motor means is inhibited when said motor shaft rotates, said motor means moving along said track means and thereby along a said desired path when said motor shaft is rotated.

9. The movable display arrangement as defined in claim 1 wherein said track means comprises two symmetrical half sections of guiding track each located on one side of said path and guiding said display support means along said path.

10. The movable display arrangement as defined in claim 1 including crankshaft means in said means to be displayed; connecting rod means connected to said crankshaft means at one end, for driving said crankshaft means; rotary means connected to the other end of said connecting rod for applying reciprocating motion to said connecting rod, when said rotary means is rotated; base means in contact with said rotary means and stationary with respect to said conveying means, said rotary means being rotatably mounted on said means to be displayed and rotating when said means to be displayed is rotated; movable portions on said means to be displayed and movable along predetermined paths and directions relative to said means to be displayed; and linkage means linking said movable portions to said crankshaft means whereby said movable portions are moved through rotation of said crankshaft means applied by rotation of said means to be displayed.

11. The movable display arrangement as defined in claim 10 wherein said means to be displayed comprises a mannequin in which said movable portions are limbs of said mannequin moved through cords in said linkage means when said mannequin rotates.

12. The movable display arrangement as defined in claim 11 including elongated rod-shaped members within the forearms and upper arm portions of said mannequin, said rod-shaped members being actuated by said cords connected to said crankshaft means.

13. The movable display arrangement as defined in claim 12 including a head actuating member connected to said crankshaft means and actuating the head of said mannequin through rotation of said crankshaft means.

References Cited

UNITED STATES PATENTS

| | | | |
|---|---|---|---|
| 569,950 | 10/1896 | Boettcher | 40—106.31 |
| 1,357,706 | 11/1920 | Halpern et al. | 40—106.34X |
| 1,775,498 | 9/1930 | Popelsky | 40—106.31 |
| 2,784,525 | 3/1957 | Grierson et al. | 40—106.31 |

LAWRENCE CHARLES, Primary Examiner